(12) United States Patent
Gard et al.

(10) Patent No.: US 6,277,353 B1
(45) Date of Patent: Aug. 21, 2001

(54) HYDRATION OF ALKALINE EARTH METAL OXIDE TO PRODUCE ALKALINE EARTH METAL HYDROXIDE

(76) Inventors: David Richard Gard, 13 Steeple Hill La., Ballwin, MO (US) 63011; Brian David Jurcak, 413 Chelsea Way Dr., St. Charles, MO (US) 63304

( * ) Notice: Subject to any disclaimer, the term of this patent is extended or adjusted under 35 U.S.C. 154(b) by 0 days.

(21) Appl. No.: 09/016,446

(22) Filed: Jan. 30, 1998

Related U.S. Application Data

(60) Provisional application No. 60/036,478, filed on Jan. 31, 1997.

(51) Int. Cl.$^7$ .................................................. C01B 13/14
(52) U.S. Cl. ..................... 423/592; 423/155; 423/635; 423/636; 501/108; 502/340
(58) Field of Search ........................... 423/592, 636–647, 423/635, 155; 502/306, 340; 501/108

(56) References Cited

U.S. PATENT DOCUMENTS

| | | | |
|---|---|---|---|
| 3,044,857 | * 7/1962 | Sable ....................... | 23/188 |
| 3,322,502 | 5/1967 | Trubey et al. ............ | 23/201 |
| 3,511,600 | 5/1970 | Kim ......................... | 23/109 |
| 3,642,264 | * 2/1972 | Mayer et al. ............ | 263/52 |
| 3,965,240 | * 6/1976 | Hughey .................... | 423/155 |
| 4,033,778 | * 7/1977 | Gilpin et al. ............. | 106/291 |
| 4,075,311 | 2/1978 | Eustacchio ............... | 423/636 |
| 4,113,834 | * 9/1978 | Show et al. .............. | 423/155 |
| 4,330,525 | * 5/1982 | Reynolds et al. ......... | 423/636 |
| 4,585,743 | * 4/1986 | Yamamoto et al. ....... | 501/108 |
| 4,698,379 | * 10/1987 | Nakaya et al. ........... | 523/513 |
| 5,143,965 | * 9/1992 | Mertz ....................... | 524/436 |
| 5,401,442 | * 3/1995 | Miyata ..................... | 252/609 |
| 5,401,484 | * 3/1995 | Wurmbauer et al. ..... | 423/592 |
| 5,405,636 | 4/1995 | Gard et al. ............... | 426/551 |

FOREIGN PATENT DOCUMENTS

| | | |
|---|---|---|
| 388635 | 5/1940 | (CA) . |
| 1069054 | 2/1958 | (DE) . |
| 0599085 | 10/1993 | (EP) . |
| 1160922 | 6/1969 | (GB) . |
| 9603346 | 8/1996 | (WO) . |
| 9833743 | 8/1998 | (WO) . |

OTHER PUBLICATIONS

Babor, Joseph A. Basic College Chemistry. Second Edition. Thomas Y. Crowell Company: New York. pp. 255–277, 1953.*

G.L. Smithson & N.N. Bakshi, "The Kinetics and Mechanism of the Hydration of Magnesium Oxide in a Batch Reactor", 47 Candaian Journal of Chemical Engineering 508–513 (Oct. 1969).

English Text Translation: Japanese Laid–Open Pataent Application (Kokai) No. 1–212214, published Aug. 25, 1989.

14 Kirk–Othmer, Encyclopedia of Chemical Technology: Laminated Wood–Based Composites to Mass Transfer (John Wiley & Sons, 3$^{rd}$ Edition (1981).

15 Kirk–Othmer, Encyclopedia of Chemical Technology: Lasers to Mass Spectrometry (John Wiley & Sons, 4$^{th}$ Edition (1995).

Food and Drug Administration, HHS, 21 CFR Ch. I (4–1–92 Edition) § 184.1434—Magnesium Phospate.

Ernest V. Pannell, "Magnesium, Its Production and Use", Chapter II, Sources of Magnesium Natural Ores, pp. 12–27, Second Edition, Sir Issac Pitman & Sons, Ltd. 1948.

(List continued on next page.)

*Primary Examiner*—Steven P. Griffin
*Assistant Examiner*—Cam N. Nguyen

(57) ABSTRACT

A process for preparing an alkaline earth metal hydroxide which comprises reacting particulate alkaline earth metal oxide having a particle size in the range from about 100 $\mu$m to about 10,000 $\mu$m with a sufficient quantity of water for a sufficient time and at a sufficient temperature to carry out the reaction effectively thereby the alkaline earth metal hydroxide is prepared.

5 Claims, 2 Drawing Sheets

OTHER PUBLICATIONS

McGraw–Hill Dictionary of Scientific and Technical Terms, Fourth Edition, Sybil P. Parker—Editor in Chief, 1989, Primary Explosive, "PRILL".

Encyclopedia of Chemical Processing and Design, Executive Editor—John J. McKetta, "Settling Drums, Design of to slag, Iron and Steel, Supply–Demand Relationships", 1995, Size Enlargement, Prilling, pp. 405–411.

Chemical Process Industries, Fouth Edition, R. Norris Shreve and Joseph A. Brink, Jr., 1977, Chapter 10, "Portland Cements, Calcium, and Magesium Compounds", pp. 156, 174–178.

Chemical Process Industries, Third Edition, R. Norris Shreve, 1967, Chapter 10, "Portland Cements, Calcium, and Magnesium Compounds", pp. 183–189.

* cited by examiner

HYDRATION OF ALKALINE EARTH METAL OXIDE TO PRODUCE ALKALINE EARTH METAL HYDROXIDE

This application claims the benefit of priority under 35 U.S.C. § 119(e) of U.S. patent application Ser. No. 60/036,478 filed Jan. 31, 1997.

This invention relates to an improved process for preparing alkaline earth metal hydroxides by the hydration of alkaline earth metal oxides. In one aspect, this invention relates to an improved process for preparing magnesium hydroxide via the hydration of magnesium oxide.

BACKGROUND OF THE INVENTION

Alkaline earth metal oxides, especially magnesium oxide, are highly useful industrial chemicals. They are used in flue gas desulfurization, wastewater neutralization and as a raw material for the manufacture of other alkaline earth metal compounds. In particular, magnesium oxide is employed as a raw material for the manufacture of other magnesium compounds. It is highly desired to have an improved method for preparing magnesium hydroxide by the hydration of magnesium oxide with water.

G. L. Smithson & N. N. Bakhshi, *The Kinetics and Mechanism of the Hydration of Magnesium Oxide in a Batch Reactor*, 47 CANADIAN JOURNAL OF CHEMICAL ENGINEERING 508–513 (October 1969), disclosed a study on the hydration of magnesium oxide and reported therein that it appeared to be a simple heterogeneous reaction and an intermediate step in the carbonation of aqueous MgO slurries. Smithson discloses that the hydration of MgO samples was carried out by adding MgO to a reactor containing distilled water. About 10 grams of MgO was reported to have been reacted with 250 milliliters of distilled water. A stirrer speed was maintained at 1600 revolutions per minute indicating agitation was employed in the reactor. According to Smithson, the size of the MgO powder fed to this reaction apparently was of the order of micro-sized particles as Smithson refers to micro-sized particles in column one, page 509 prior to disclosing the hydration process. Smithson noted that his MgO particles were apparently reactive. Smithson also discloses that the reactivity of MgO powders is dependent on surface area and calcination temperature and teaches that higher relative reactivity of MgO particles is obtained when one uses MgO with a high surface area and which has been calcined at a temperature below about 1200° C.

Japanese Laid-Open Patent Application (Kokai) No. 1-212214, published Aug. 25, 1989 (English text translation), discloses a method for manufacturing magnesium hydroxide where reportedly magnesium oxide with an average particle diameter of 100 $\mu$m or less can be hydrated in an aqueous medium in a stirred reactor (agitation) containing (a) one or more types of cations selected from the group consisting of alkali metal ions, alkaline earth metal ions and ammonium ions and (b) one or more types of anions selected from the group consisting of hydroxide ions, nitric acid ions, carbonic acid ions, chlorine ions and sulfuric acid ions. This published patent application teaches that the magnesium oxide must have an average particle diameter of 100 $\mu$m or less, with 50 $\mu$m or less being preferable and 20 $\mu$m or less being even better. This published patent application discloses that if the average particle diameter of the magnesium oxide exceeds 100 $\mu$m, the suspension stability of the magnesium hydroxide slurry will be poor and there will be problems with the unreacted residue increasing the amount of scaling and the suspended solids load.

Magnesium oxide (magnesia, MgO) is the principal product of the magnesium compounds industry. Further, according to 14 KIRK-OTHMER, ENCYCLOPEDIA OF CHEMICAL TECHNOLOGY: Laminated Wood-Based Composites to Mass Transfer (John Wiley & Sons, 3rd Ed. (1981)), magnesium occurs as the mineral periclase in nature. But, magnesium also occurs naturally in brines, seawater, magnesite and dolomite and also it occurs as disseminated crystals or clusters of crystals in marbles. The principal properties of magnesium oxide are provided in the 14 ENCYCLOPEDIA OF CHEMICAL TECHNOLOGY, Table 12, pp. 629–646, all of which is incorporated herein by reference in its entirety.

Commercial magnesium oxide is available as caustic calcined magnesia, dead-burned magnesia, hard-burned magnesia and fused magnesia. As described in ENCYCLOPEDIA OF CHEMICAL TECHNOLOGY, supra, and other technical sources, dead-burned magnesias are produced above 1400° C. and are characterized by their low chemical reactivities and their resistance to the basic slags employed in the metals refining industry. ENCYCLOPEDIA OF CHEMICAL TECHNOLOGY, supra, teaches that, typically, the sizes range from about 30 $\mu$m to about 100 $\mu$m in diameter. Magnesium oxide is light, has a high melting temperature and is brittle.

The process of this invention overcomes the low chemical reactivity of MgO calcined at temperatures in excess of 1200° C., e.g. and provides a process which effectively accommodates a far wider range of particle sizes of magnesium oxide and avoids any need to grind or reduce purchased or intact MgO to powder size before hydration can be carried out. This invention can be carried out in a quiescent state and without the addition of cations.

OBJECTS OF THE INVENTION

It is an object of this invention to provide an improved process for hydrating particulate size alkaline earth metal oxide to prepare alkaline earth metal hydroxide.

It is another object of this invention to provide an improved process for preparing alkaline earth metal hydroxide whereby the hydration is accomplished without the addition of extra cations.

It is a further object of this invention to provide an improved process for preparing alkaline earth metal hydroxide whereby the hydration is accomplished in a quiescent state.

It is yet another object of this invention to provide an improved process for preparing alkaline earth metal hydroxide using a wide range of particle-sized alkaline earth metal oxide.

It is another object of this invention to provide an improved process for hydrating magnesium oxide to prepare magnesium hydroxide.

It is a still further object of this invention to provide an improved process for hydrating low-impurity alkaline earth metal oxide to alkaline earth metal hydroxide which has a low impurities content.

It is a further object of this invention to provide an improved process for hydrating a dead-burned magnesium oxide to magnesium hydroxide.

These and other objects of the inventions are met in the process of this invention which is described in more particularity hereinafter.

BRIEF SUMMARY OF THE INVENTION

This invention comprises a process for preparing an alkaline earth metal hydroxide product which comprises hydrating particulate alkaline earth metal oxide having a particle size in the range from about 100 μm to about 10,000 μm with a sufficient quantity of water for a sufficient time and at a sufficient temperature to effectively carry out the hydration whereby the corresponding alkaline earth metal hydroxide is prepared. Typically, this process is carried out at a temperature in the range from about 85° C. to about 160° C. The reaction may be carried out in a stirred reactor or the mixture of reactants may be maintained in a quiescent state for a sufficient time and at a sufficient temperature under conditions sufficient to carry out the reaction.

BRIEF DESCRIPTION OF THE SEVERAL VIEWS OF THE DRAWINGS

FIG. 1 shows data from Example 1 and shows the extent of hydration of dead-burned magnesium oxide as a function of time at 100° C. and 20% solids for various particle sizes expressed as mesh size. The data in FIG. 1 shows that the dead-burned magnesium oxide hydrates at a rate virtually independent of particle size.

FIG. 2 shows data from Examples 2 and 3 and shows the extent of hydration of dead-burned magnesium oxide at 20% solids as a function of time at different temperatures.

DETAILED DESCRIPTION OF THE INVENTION

Figure 1:
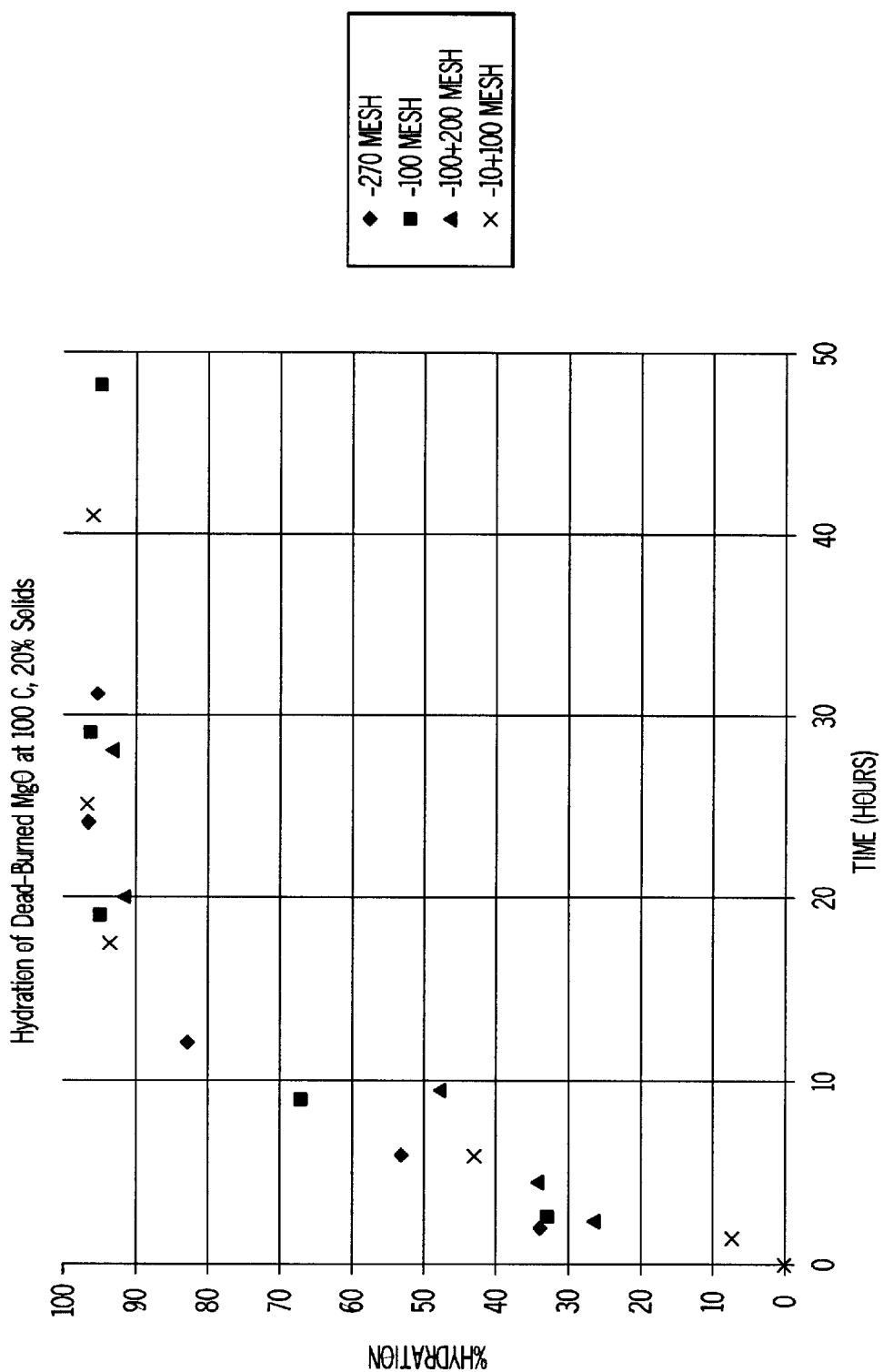
FIGS. 1 and 2 show data graphically which has been obtained from EXAMPLES 1–2 hereinafter following.

This invention comprises a process for preparing an alkaline earth metal hydroxide product which comprises reacting particulate alkaline earth metal oxide having a particle size in the range from about 100 μm to about 10,000 μm with a sufficient quantity of liquid water for a sufficient time and at a sufficient temperature to carry out said hydration whereby said alkaline earth metal hydroxide is prepared.

Typical alkaline earth metal hydroxides which may be prepared employing the process of this invention include such alkaline earth metal hydroxides such as the hydroxides of calcium, magnesium, strontium, barium, beryllium, radium, mixtures thereof and the like. A preferred alkaline earth metal hydroxide is magnesium hydroxide.

Typical alkaline earth metal oxides which may be employed in the process of this invention include such alkaline earth metal oxides as the calcium oxide, magnesium oxide, strontium oxide, barium oxide, beryllium oxide, radium oxide, mixtures thereof and the like. A preferred alkaline earth metal oxide is magnesium oxide.

Typical particle size ranges of alkaline earth metal oxides which may be employed in practicing this invention are from about 100 μm to about 10,000 μm, and more preferably from about 120 μm to about 5000 μm and most preferably from about 149 μm to about 2000 μm.

A useful magnesium oxide herein is one which has a relatively low-surface area for example, of less than about 2 meter$^2$ per gram and one that has a citric acid activity (CAA) greater than about 1500 seconds. A low impurities content magnesium oxide is also preferred.

Such calcined magnesium oxides are typically referred to in the art as hard-burned (about 1200° C.+) and dead-burned (about 1400° C. and higher) magnesium oxides respectively because the calcination temperature is above about 1200° C. Magnesium oxides which are calcined at temperatures above about 1200° C. may contain lower amounts of some impurities and so it is an economical advantage to employ a low impurity level magnesium oxide as a reactant in this invention coupled with the advantage of being able to use intact magnesium oxide to prepare magnesium hydroxide.

In carrying out the process of this invention according to a preferred embodiment, reactant magnesium oxide is added to a reaction vessel which contains liquid water, such as tap water or water preferably of a low-mineral content. However, the reactant water may be added to a reaction vessel holding magnesium oxide or the two reactants may be added together to a reaction vessel. The order of addition of the reactants alkaline earth metal oxide and water is not critical, although one may desire to add a portion of the water to the reaction vessel first and then add the magnesium oxide such as magnesium oxide with the remainder of the water then being added. This addition order may cushion the impact of adding magnesium oxide to the bottom of a reaction vessel. Additional water may be added to the reaction vessel as the hydration proceeds if desired.

Without being bound by theory, it is believed that magnesium oxide is reacted with water in this hydration. This hydration is carried out at a sufficient temperature in the range from about 85° C. to about 160° C. and preferably from about 90° C. to about 150° C., although greater or lesser temperatures may be employed if desired as long as such temperatures are effective to hydrate the oxide.

Typically, the amount of time which is required for the hydration to have been accomplished varies with temperature and other reaction conditions; however, typically the reaction time is in the range from about 4 hours to about 72 hours, and preferably from about 6 hours to about 8 hours, although greater or lesser times may be employed if desired as long as such times are effective to allow sufficient hydration of the alkaline earth metal oxide to alkaline earth metal hydroxide.

Generally, the preferred particle shape of alkaline earth metal oxide in practicing this invention is a particulate shape which means a shape that is cylindrical or preferably round or generally round, although an exactly round particle is not required. The particle size distribution is typically in the range described herein and generally, a prill-shaped form is preferred for ease of handling. The term "prill" is employed here for illustrative purposes only to mean a roughly spherical particle. For illustration purposes, a typical prill shape is the shape of a granular commercial fertilizer pellet.

The process of this invention may be carried out in a stirred or quiescent state reaction system with the quiescent state being the preferred state.

A preferred method of carrying out the process of this invention is to maintain the preferred reactants, for example, water and magnesium oxide in a quiescent state in the reaction vessel such as a reactor. The term "reaction vessel" includes any container or vessel which may be suitably employed to react alkaline earth metal oxide and water. If desired for some reason, this invention may be practiced by admixing the alkaline earth metal oxide and water and carrying out a size reduction operation as the hydration is carried out.

As employed herein, the term "quiescent" means a quiet state or an inactive or substantially inactive state with minimal agitation physically of the reactants although a quiescent reaction includes a reaction where there is effective and substantial completion of the reaction. Quiescent also means latent but capable of being activated. Reaction systems which are undergoing reaction, such as the invention here, may be agitated, mixed or stirred occasionally so that a sample representative of the reaction system may be taken. Such agitating, mixing or stirring is not deemed to disturb the essentially quiescent state of the reaction system nor is a mild amount of mixing due to any kind of thermally-induced agitation brought about by any heat energy applied to the reaction system to maintain constant temperature and is within the scope of the quiescent state.

This quiescent method is particularly preferred in that some magnesium oxide (prill) is classified as a ceramic and any significant mixing of magnesium oxide prills in a metal reactor will cause some, and perhaps significant, erosion of the metal walls or surface of the reaction vessel. In these situations, the hydration mixture can pick up substantial metals from a metal reactor and the reaction system can turn a dark color indicating such metal pickup. The ability to carry out this process of this invention in a quiescent reaction allows this hydration reaction to be carried out in a conventional metal reactor. Accordingly, the process of this invention may be carried out in a quiescent state thereby minimizing any surface damage to the reactor vessel walls, irrespective of the wall construction material. If it is desired to carry out the process of this invention employing stirring, then a glass or glass-lined or ceramic reactor is preferred. Practicing the process of this invention in a quiescent state may enable one to produce a magnesium hydroxide which has a metals content and level which are essentially the same content and level as that of the corresponding magnesium oxide thereby avoiding a discolored product.

One of skill in the art will recognize that a pressurized system may be employed to facilitate the hydration (chemical reaction) of the alkaline earth metal oxide to the alkaline earth metal hydroxide product. Typically, the pressures may range from about 101 kilopascal (atmospheric) to about 305 kilopascal (3 atmospheres absolute pressure). The temperature of the reaction system will be maintained at a sufficient temperature and generally this is a temperature which corresponds to the boiling point of the aqueous system of alkaline earth metal oxide and water at the pressure selected for hydration. Those of skill in the art will recognize that preferred pressures will preferably be no higher than about 305 kilopascals (3 atmospheres absolute) because of the need to employ high-strength containers at or above that operating pressure. When a pressurized system is employed, a reflux condenser may be employed therewith. Typically, stainless steel construction, such as 304 stainless steel, will be employed in the reaction vessel for pressure-type hydrations at or exceeding 305 kilopascals.

The amount of water employed to react with the alkaline earth metal oxide is preferably in a weight ratio of the amount of alkaline earth oxide employed to water from about 1:99 to about 40:60 and more preferably from about 15:85 to about 25:75 (by weight ratio).

EXAMPLES

Example 1

The process of this invention and compositions of this invention are illustrated in these EXAMPLES.

Dead-burned magnesium oxide prills having a particle size range of about −10+100 mesh (149 μm to 2000 μm (micron) were used and were purchased from National Magnesia, grade OOHB prills. These prills had a surface area of less than about 2 meter$^2$ per gram and had a citric acid activity (CAA) of seconds greater than 1500 according to the manufacturer's technical data sheet. These unground MgO prills were ground in a Raymond hammer mill to produce a series of various finer screen sizes further detailed below. More extensive milling yielded finer size grinds. The prills, intact (as purchased) and ground, were added to tap water at a concentration of about 1 part by weight MgO to about 4 parts by weight water (about 20% MgO by weight) to produce a MgO slurry in a closed glass vessel (2 liter round-bottomed flask). The vessel held approximately 1.2 liters of slurry and had a water-cooled reflux condenser on the top to return condensed water to the slurry. The MgO slurry was agitated by using a mechanical stirrer and heated to a constant temperature of about 100° C. by using a heating mantle and while maintaining a slow reflux by use of a water-cooled reflux condenser. Samples of slurry were withdrawn at various time intervals as indicated in the data to determine the degree to which the MgO had hydrated as a function of elapsed hydration time.

The mesh size of the MgO prills after being hammer milled as described above, along with the time and degree of hydration after undergoing hydration in the glass vessel described above, is provided below.

Approximately 25–50 grams of a representative sample of the hydrating MgO water slurry is vacuum filtered to recover the solids as a filter cake. The filter cake is washed to remove free water by mixing with 30–40 milliliters of acetone and again filtering. The acetone wash and filtration are repeated. The washed cake is then spread on a watch glass and dried at 105° C. to a relatively constant weight (at least 15 minutes). A loss-on-ignition (LOI) is then determined for the washed and dried cake as follows:

Approximately 2.5 grams of washed and dried cake is weighed exactly into a tared, dry ceramic crucible. The crucible containing the cake is heated in a furnace at 800° C. (ignited) for at least 30 minutes and then allowed to cool to room temperature in a desiccator and then weighed. The weight of the crucible is subtracted to obtain the weight of the cake after igniting. The % LOI is determined as:

$$\% \; LOI = \frac{\text{Ignition Weight Loss} * 100\;\%}{\text{Original Weight of Washed \& Dried Cake}}$$

The weight loss associated with the LOI determination on the washed and dried cake corresponds to the conversion of magnesium hydroxide in the hydration mixture to magnesium oxide and water vapor.

As recited above, the degree of hydration was calculated by measuring the percent loss on ignition (% LOI) of each sample of MgO solids (slurry) prior to hydration or which had undergone hydration. The MgO prills (unground and at the start of this EXAMPLE and in the early stages of hydration) exhibited a negligible % LOI while the fully hydrated material (Mg(OH)$_2$) had the theoretical 30.89% LOI. The extent of hydration may be correlated to the proportion of $$\% \; \text{Hydration} = \frac{\% \; LOI}{0.4469\,(100 - \% \; LOI)} \times 100$$

As indicated in Table 1 and FIG. 1, surprisingly the rate of hydration of the dead-burned MgO to magnesium hydroxide is virtually independent of the magnesium oxide particle size, i.e., unground prills can be hydrated essentially as effectively as ground MgO, in the process of the invention.

Example 1

TABLE 1

HYDRATION OF NATIONAL DEAD-BURNED MgO AT 100 C, 20% SOLIDS AS A FUNCTION OF PARTICLE SIZE

| | % Hydration of Dead-Burned MgO as a Function of Particle Size | | | |
|---|---|---|---|---|
| Time (Hours) | −270 Mesh | −100 Mesh | −100 + 200 Mesh | −10 + 100 Mesh |
| 0 | 0 | 0 | 0 | 0 |
| 1.5 | — | — | — | 7.3 |
| 2 | 33.8 | — | — | — |
| 2.5 | — | 32.6 | 26.3 | — |
| 4.5 | — | — | 34.3 | — |
| 6 | 53 | — | — | 42.9 |
| 9 | — | 66.8 | — | — |
| 9.5 | — | — | 47.9 | — |
| 12 | 82.8 | — | — | — |
| 17.5 | — | — | — | 93.6 |
| 19 | — | 95.1 | — | — |
| 20 | — | — | 91.9 | — |
| 24 | 96.9 | — | — | — |
| 25 | — | — | — | 96.4 |
| 28 | — | — | 93.4 | — |
| 29 | — | 96.4 | — | — |
| 31 | 95.9 | — | — | — |
| 41 | — | — | — | 96.4 |
| 48 | — | 94.9 | — | — |

\* "—" denotes samples were not taken.

Example 2

Effect of Temperature

Unmilled (intact) dead-burned magnesium oxide prills having a particle size range of −10+100 mesh were placed in water at about 1 part by weight MgO to about 4 parts by weight water (about 20% MgO by weight) to form a magnesium oxide slurry. The MgO slurry was agitated and heated to a temperature of about 100° C., 120° C. or 130° C. which was maintained by heating the samples in a 1 liter agitated glass autoclave under pressure. Samples of slurry were withdrawn at various time intervals for loss of ignition analysis to determine the degree of hydration of the MgO to magnesium hydroxide.

Figure 2:
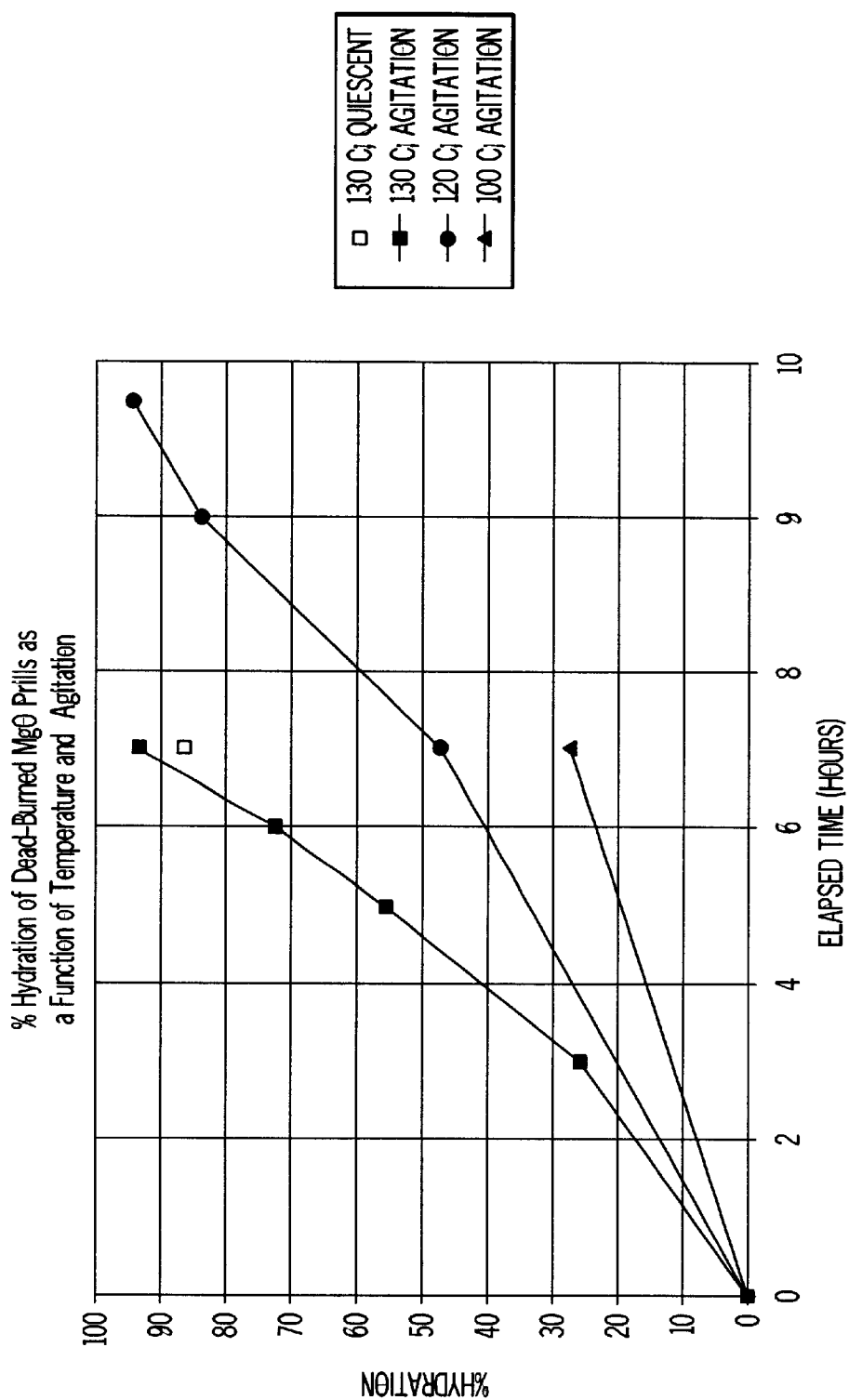

As indicated in Table 2 and FIG. 2, the rate of hydration of the dead-burned MgO prills can be accelerated by increasing the temperature of the slurry comprising the magnesium oxide and water reactants.

Example 2

TABLE 2

HYDRATION OF NATIONAL MAGNESIA CHEMICALS DEAD-BURNED MgO PRILLS UNDER PRESSURE; 20% SOLIDS

| | % Hydration as a Function of Time at Various Temperatures With Agitation | | |
|---|---|---|---|
| Time (Hours) | 130 C; Agitation | 120 C; Agitation | 100 C; Agitation |
| 0 | 0 | 0 | 0 |
| 3 | 25 | — | — |
| 5 | 54.8 | — | — |
| 6 | 72 | — | — |
| 7 | 92.9 | 47.3 | 27.1 |
| 10 | — | 83.5 | — |
| 11.5 | — | 94.1 | — |

\* "—" denotes samples were not taken.

Example 3

This Example was done to show the effect of agitation of the reaction system comprising a slurry of magnesium oxide and water.

Unmilled dead-burned magnesium oxide prills having a particle size range of about −10+100 mesh were placed in water at about 1 part by weight MgO to about 4 parts by weight water (about 20% MgO by weight) to form a slurry. This MgO slurry was agitated and heated to about 130° C. in an autoclave under pressure. One sample was run with vigorous agitation, the other without which was characterized as a quiescent state of hydration. Samples of slurry were withdrawn after 7 hours to determine the degree to which the MgO had hydrated. The percentage hydration in the unagitated hydrated sample was 86.2% vs. 92.9% in the agitated hydrated sample. The rate of hydration of the dead-burned MgO prills was not significantly affected by agitation of the slurry. Both samples showed that the process of this invention had been effectively carried out by the reaction of dead burned magnesium oxide with water.

Example 3

TABLE 3

HYDRATION OF NATIONAL DEAD-BURNED MgO PRILLS UNDER PRESSURE; 20% SOLIDS

| | % Hydration at 130° C. as Function of Agitation | |
|---|---|---|
| Time (Hours) | 130 C; Agitation | 130 C; Quiescent |
| 0 | 0 | 0 |
| 7 | 92.9 | 86.2 |

As indicated in Table 3 and FIG. 2, the rate of hydration is essentially the same for reactions conducted under agitated and quiescent conditions.

Example 4

About 5000 lb. of dead-burned MgO prills were poured into a tank containing 3000 gallons of tap water at about 98° C. There was no agitation (illustrative of a quiescent state or nonagitated reaction state of the slurry), except for a few minutes of mild agitation immediately proceeding the time whereby the tank contents were sampled for hydration analysis. The extent of hydration was as follows:

| Hours | % Hydration |
|---|---|
| 19 | 84 |
| 22 | 89 |
| 25 | 90 |
| 27 | 92 |
| 46 | 95 |

Again, these samples showed that an effective hydration had been carried out by reacting dead-burned magnesium oxide with water.

Example 5

About 8200 lb. of dead-burned MgO prills were dumped into a tank containing about 3000 gallons of hot water 95° C. to 98° C. There was no agitation (quiescent state), except for a few minutes prior to the time of collecting a sample for analysis. This agitation was done for the purpose of obtaining a well-mixed tank sample and comprised sporadic stirring once per hour for about 30 seconds to obtain a good mix in a 304 stainless steel vessel. The quiescent state of the reaction was maintained throughout the stirring. The temperature was maintained at 95° C. to 98° C. The extent of hydration was:

|       | % Hydration |       |       |
| ----- | ----------- | ----- | ----- |
| Hours | Run 2       | Run 3 | Run 4 |
| 18.5  |             |       | 93    |
| 20.5  |             | 90    |       |
| 21.75 | 91          |       |       |
| 22.5  |             | 93    |       |
| 31.75 | 95          |       |       |

Thus, it is apparent that there has been provided, in accordance with the instant invention, a process that fully satisfies the objects and advantages set forth herein above. While the invention has been described with respect to various specific examples and embodiments thereof, it is understood that the invention is not limited thereto and many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A process for preparing magnesium hydroxide which comprises reacting dead-burned magnesium oxide having a particle size in the range from about 100 $\mu$m to about 10,000 $\mu$m with an amount of water and at a reaction time and reaction temperature sufficient to produce said magnesium hydroxide.

2. The process of claim 1, wherein said reaction of magnesium oxide to said magnesium hydroxide is carried out in a quiescent state.

3. A process for preparing magnesium hydroxide which comprises reacting particulate magnesium oxide which has been calcined at a temperature of 1400° C. or above, having a particle size in the range from about 100 $\mu$m to about 10,000 $\mu$m with an amount of water and at a reaction time and reaction temperature sufficient to produce said magnesium hydroxide.

4. The process of claim 3, wherein said reaction of magnesium oxide to said magnesium hydroxide is carried on in a quiescent state.

5. The process of claim 3 wherein the particle size of said magnesium oxide is in the range from about 120 $\mu$m to about 5,000.

* * * * *